United States Patent
Mullally et al.

(10) Patent No.: US 7,159,843 B1
(45) Date of Patent: Jan. 9, 2007

(54) NON-SLIDING VALVE

(75) Inventors: Michael J. Mullally, Clifton Springs, NY (US); Paul E. Welker, Clifton Springs, NY (US)

(73) Assignee: SealTech, Inc., Clifton Springs, NY (US)

( * ) Notice: Subject to any disclaimer, the term of this patent is extended or adjusted under 35 U.S.C. 154(b) by 0 days.

(21) Appl. No.: 11/131,495

(22) Filed: May 18, 2005

Related U.S. Application Data

(63) Continuation-in-part of application No. 10/953,648, filed on Sep. 29, 2004.

(51) Int. Cl.
*F16K 31/02* (2006.01)

(52) U.S. Cl. .................. 251/129.16; 251/337

(58) Field of Classification Search ........... 251/129.16, 251/129.15, 337
See application file for complete search history.

(56) References Cited

U.S. PATENT DOCUMENTS

| | | | | |
|---|---|---|---|---|
| 2,588,137 A | * | 3/1952 | Marvin ................ | 251/129.16 |
| 2,631,612 A | * | 3/1953 | Buescher ............. | 251/129.16 |
| 3,921,670 A | * | 11/1975 | Clippard et al. ..... | 251/129.15 |
| 4,196,751 A | * | 4/1980 | Fischer et al. ....... | 251/129.16 |
| 4,250,924 A | | 2/1981 | Sakakibara et al. ... | 137/868 |
| 4,463,969 A | * | 8/1984 | Harrison ............. | 251/129.16 |
| 4,852,605 A | * | 8/1989 | Gouhier .............. | 251/129.16 |
| 4,951,916 A | * | 8/1990 | Kanameda et al. ..... | 251/129.16 |
| 5,054,691 A | * | 10/1991 | Huang et al. ......... | 251/129.16 |
| 5,662,461 A | | 9/1997 | Ono .................. | 417/418 |
| 5,924,674 A | * | 7/1999 | Hahn et al. .......... | 251/129.16 |
| 6,068,010 A | * | 5/2000 | Reinicke ............. | 251/129.16 |
| 6,135,132 A | | 10/2000 | Welker et al. ........ | 137/15 |
| 6,220,569 B1 | * | 4/2001 | Kelly ................ | 251/129.08 |
| 6,227,240 B1 | * | 5/2001 | Wu et al. ............ | 251/337 |
| 6,415,817 B1 | * | 7/2002 | Krimmer et al. ....... | 251/129.16 |
| 6,546,945 B1 | | 4/2003 | Ishigaki et al. ...... | 137/15.18 |
| 6,764,061 B1 | * | 7/2004 | Haeberer et al. ...... | 251/129.16 |
| 6,820,651 B1 | * | 11/2004 | Seuret et al. ........ | 251/129.16 |
| 6,830,231 B1 | | 12/2004 | Paessler et al. ...... | 251/129.15 |
| 2004/0021107 A1 | | 2/2004 | Kimura et al. ........ | 251/65 |

FOREIGN PATENT DOCUMENTS

EP        1 350 999 A1 *  10/2003

* cited by examiner

*Primary Examiner*—John Bastianelli
(74) *Attorney, Agent, or Firm*—Brown & Michaels, PC

(57) ABSTRACT

A solenoid valve moves an armature back and forth translationally between valve open and valve closed positions without the armature having any sliding engagement with any fixed valve part. This is accomplished by supporting the armature with a spring having one periphery engaging a fixed valve surface and another periphery engaging the armature so that armature movement causes flexure of the spring, but no sliding contact. This helps prevent generation of dirt within the valve and ensures accurate armature movement to make the valve durable and reliable. Springs in both washer and cylindrical helical shapes can accomplish this, and the armatures supported by such springs can accommodate valve closing seals of different materials and shapes.

27 Claims, 8 Drawing Sheets

VALVE SHOWN OPEN

VALVE SHOWN OPEN

VALVE SHOWN CLOSED

SPRING WASHER 5 lb MONO-PROPELLANT SOLENOID VALVE

NON-SLIDING VALVE

RELATED APPLICATIONS

This application is a continuation-in-part of copending application Ser. No. 10/953,648, filed 29 Sep. 2004, entitled "Non-sliding Valve".

BACKGROUND

Meeting the most challenging reliability standards requires solenoid valves to operate cleanly without developing any contamination particulates within the valve during repeated actuations. For example, solenoid valves must be especially free of particles to be deployed in space vehicles and satellites where valve performance must be highly reliable and valve failure can be disastrously expensive.

This invention involves recognition of ways that particles are created during operation of solenoid valves, and ways to avoid such particle contamination. Besides avoiding valve failures from internal contamination, the invention aims at more reliable valve operation accomplished by especially accurate valve opening and closing motions. While combining particle avoidance and accurate movements, the invention also aims at ensuring valve durability and dependability at an affordable price.

SUMMARY

The inventive valve avoids internal particle generation by avoiding sliding contact between a movable armature and fixed valve surfaces during valve operation. Experiments have established that sliding contact between valve parts produces tiny contaminant particles that can migrate to sensitive internal regions of the valve and cause leakage or mal-performance. The invention thus aims at a cleaner and more reliably operating valve by eliminating such sliding contact.

In addition to eliminating contamination from sliding contact, the invention also aims at consistently moving a valve closing puck or seal into engagement with a valve seat so that contact between the seal and the seat always occurs in precisely the same region of the seal or puck. This ensures that leakage does not occur from eccentric seating ring engagement between the seal and the valve seat.

A spring support and guidance system accomplishes the movement of an armature of a solenoid clear of any sliding contact with valve parts. The armature preferably carries a valve-closing seal and is supported by a spring system to move axially in translation without moving radially or rotationally. The armature can engage a non-magnetic stop when moved to a fully open position by the solenoid, but such engagement does not involve any sliding contact and does not produce noticeable particles.

One spring system for accomplishing this uses a washer shaped annulus that connects to an armature at an internal periphery and connects to a valve body at an external periphery. Such an arrangement ensures that the armature cannot move radially or rotationally and is able to translate only axially during valve opening and closing. Another spring support embodiment uses a generally helical cylindrical spring flanged at one end to fit a fixed valve surface and flanged at another end to fit to and support the movable armature. Helical turns of the spring between the flanged ends flex to allow the armature to move translationally but not radially, with neither the spring nor the armature involved in any sliding contact with any valve surface.

DRAWINGS

FIG. 1 is a fragmentary cross-sectional view of a preferred embodiment of the inventive non-sliding valve shown in a closed valve position, FIG. 2 is a fragmentary cross-sectional view similar to the view of FIG. 1, showing a valve open position.

FIGS. 3A–C are plan views of alternative variations in spring supports such as used in FIGS. 1 and 2.

DETAILED DESCRIPTION

Figure 2:
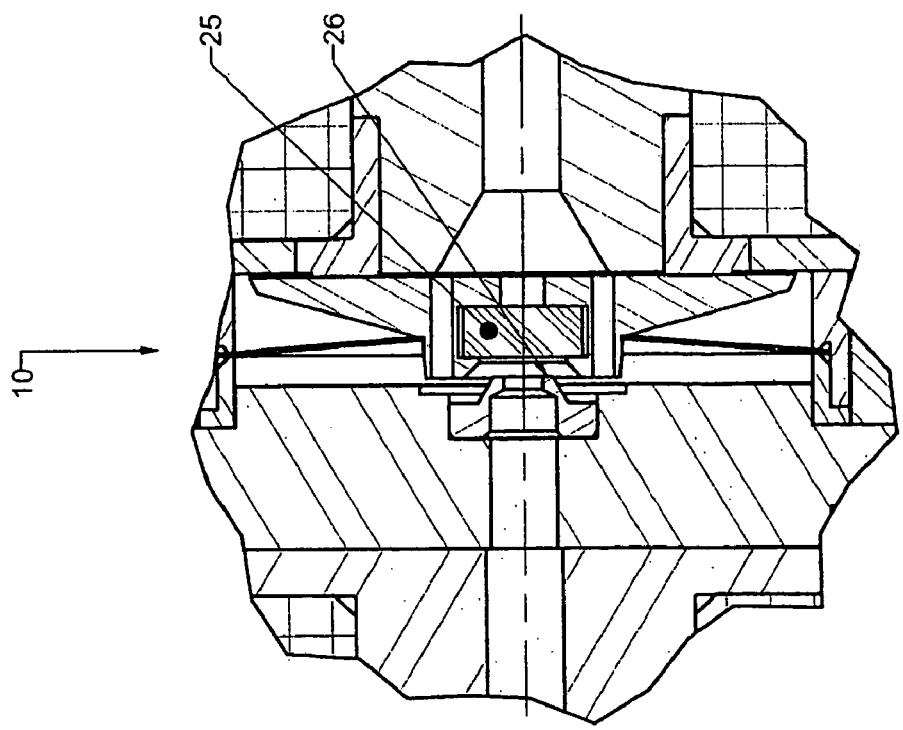
Figure 1:
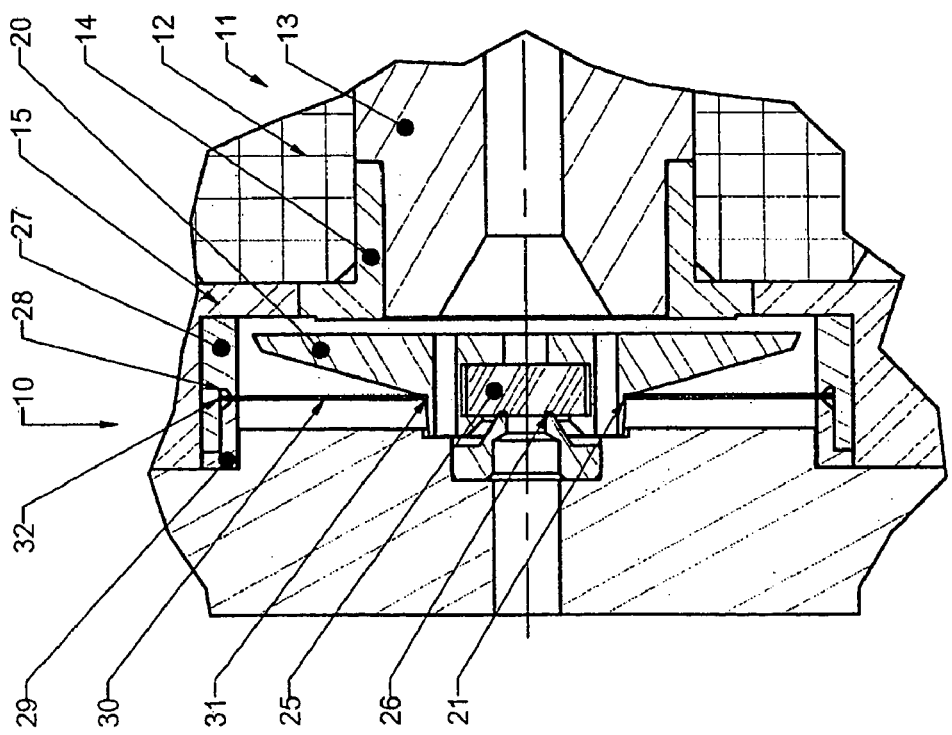
Figure 4:
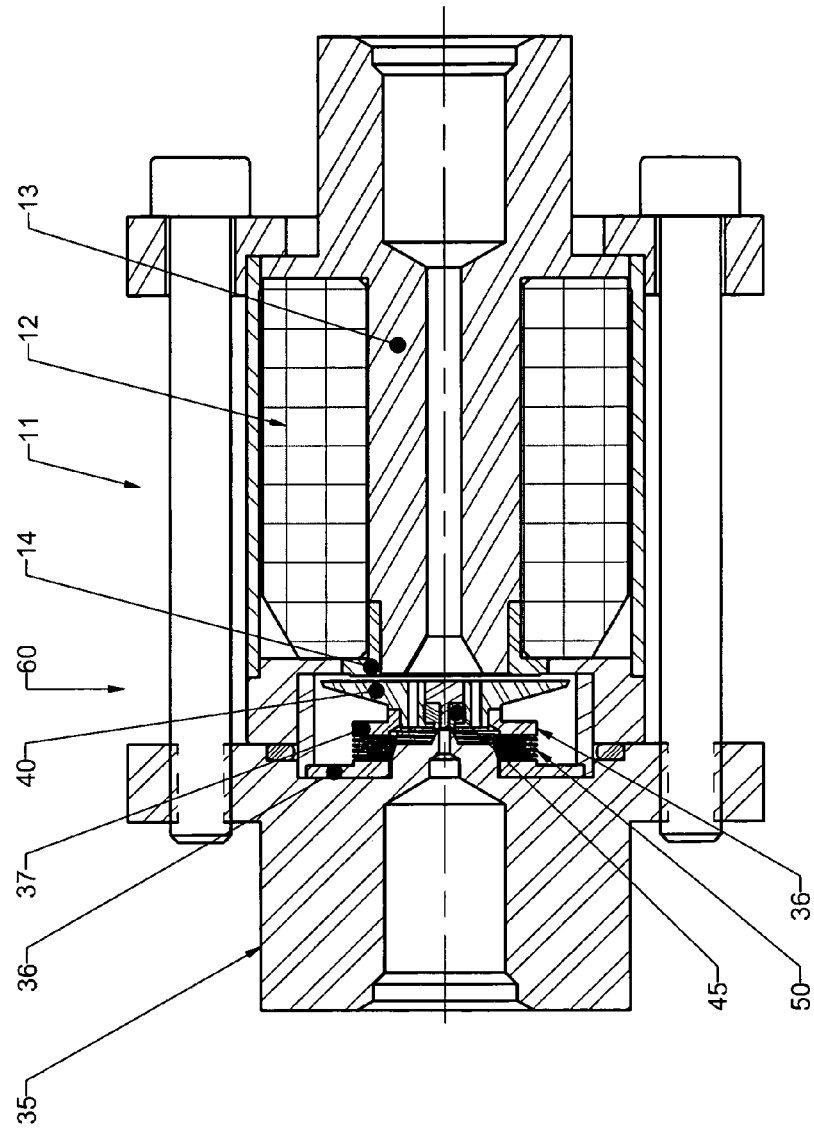
FIG. 4 is a fragmentary cross-sectional view of a helical spring embodiment of the invention showing the valve in a closed valve position.
Figure 5:
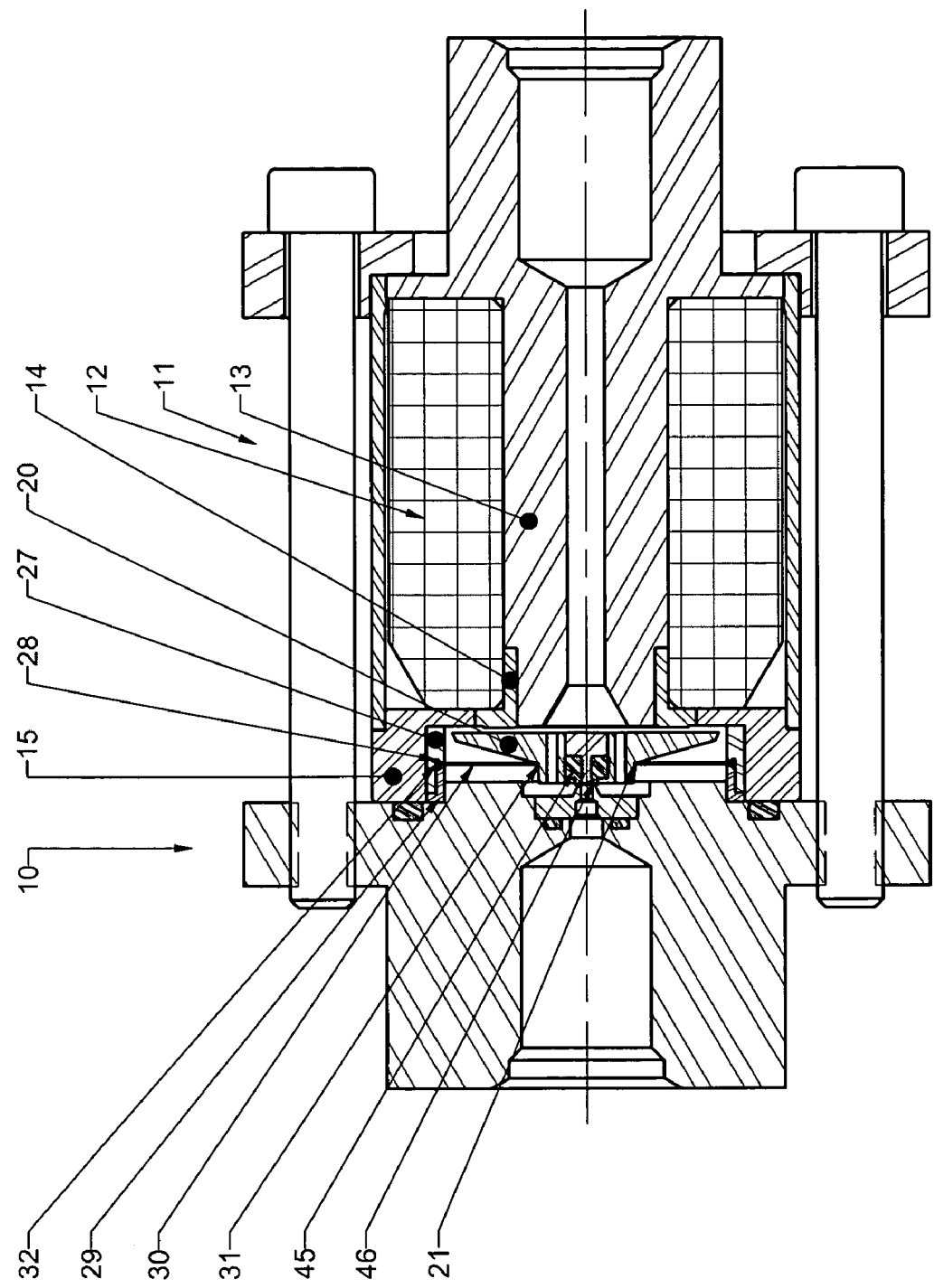
FIG. 5 is a fragmentary cross-sectional view showing a seal of the type illustrated in FIG. 4 applied to an armature supported by a washer shaped spring such as illustrated in FIGS. 1 and 2.

One preferred embodiment of a non-sliding valve 10, as shown in FIGS. 1 and 2, includes armature 20 supported by spring 30 and carrying valve closing puck or seal 25 and solenoid 11 formed of coil 12, non magnetic flux stop 13 and non-magnetic core or abutment 14. A flux path transmitted from coil 12 through solenoid body 15 to a periphery of armature 20 draws armature 20 against stop 14 to open valve 10, as shown in FIG. 2. The seal 25 that is shown in FIGS. 1 and 2 is a cylindrically shaped puck of a flexible material that is available for valve closing seals. Seals of other materials and forms are also possible, and one of these is illustrated in FIGS. 4 and 5 and explained below.

Figure 3A:
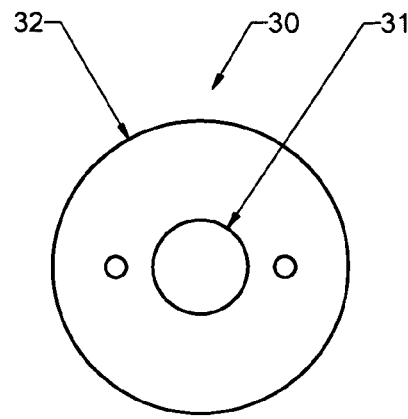
Figure 3B:
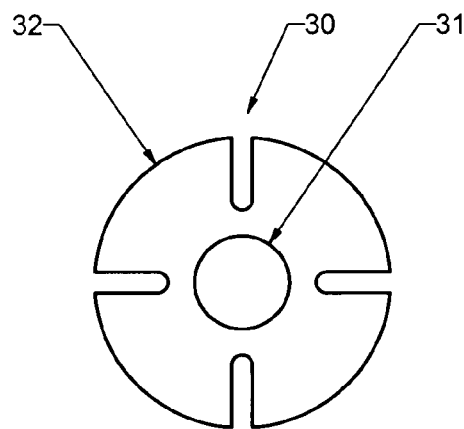
Figure 3C:
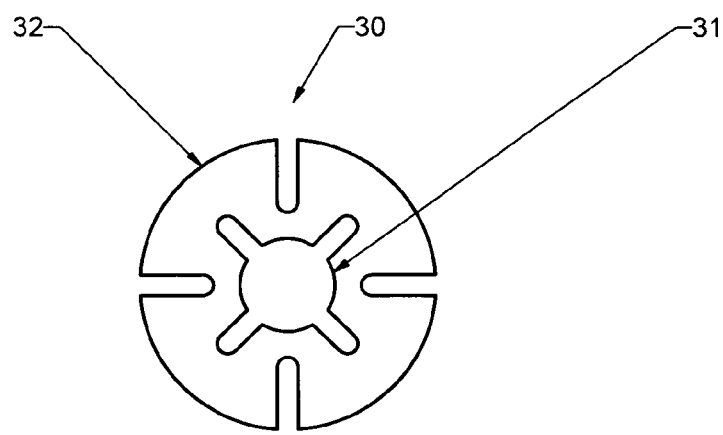

In the position of FIG. 1, puck 25, which is elastomeric or compressible, engages a valve seat 26 in valve body 27 to close valve 10. Armature 20 moves linearly and axially toward and away from valve seat 26, without engaging valve parts in any sliding contact. Spring 30, which makes this possible, is shaped as a plane annular disk resembling a washer, as shown in FIG. 3. An internal or inside diameter 31 of a central opening in spring 30 engages armature 20, and an outside diameter or outer periphery 32 is seated in a groove 28 in valve body 27.

In the position shown in FIG. 1, spring 30 is biased to press armature 20 and puck 25 against valve seat 26 in a normally closed valve position. When solenoid 11 actuates, it draws armature 20 against the bias of spring 30 to the open valve position shown in FIG. 2 in which puck 25 moves away from valve seat 26 and allows fluid flow.

The connection between spring 30 and armature 20 is preferably made by a close tolerance fitting of an internal diameter 31 of spring 30 into groove 21 in armature 20. This is preferably accomplished by chilling armature 20 to a low temperature, while keeping spring 30 at a higher temperature so that the ID 31 of spring 30 can be snapped into groove 21 for a snug fit when armature 20 and spring 30 reach the same temperature.

The outer perimeter 32 of spring 30 is preferably secured in valve body groove 28 by means of a spacer ring 29 having a press fit within valve body part 27. As spring 30 flexes between the closed valve position of FIG. 1 and the open valve position of FIG. 2, its outer perimeter 32 moves slightly within groove 28, but this movement has been shown by experiment not to produce any significant contamination particulate. The movement is very slight and is confined within a substantially closed groove 28.

The valve closing bias of spring 30 is affected by how tightly ring spacer 29 encloses the outer perimeter 32 of spring 30 within groove 28. The correct adjustment of this is preferably accomplished by machining ring spacer 29 until its press fit into valve body part 27 produces the correct clearance for groove 28 to give spring 30 its closing bias. This closing bias is also selected to be overcome by solenoid 11 when actuated to open valve 10.

The movement of armature 20 against the fixed, nonmagnetic abutment 14 is a non-sliding, tapping motion that essentially does not produce particles. Such a tapping motion contrasts significantly with a sliding motion of an armature or its guide against a fixed valve surface. The lack of particles from a non-sliding motion has been established by tests involving many millions of openings for valve 10.

The geometry of spring 30 ensures that armature 20 cannot depart from a linear axial movement toward and away from valve seat 26. Such movement is physically defined as a translation involving movement of every point of armature 20 parallel to, and at the same distance as, every other point of armature 20 without any rotation or arcuate movement of armature 20 around any axis. Such translational movement is also clear of any sliding contact with any valve part to ensure particle-free and reliable operation. This arrangement also brings puck 25 accurately back to the same engagement with valve seat 26 for each subsequent closed valve position so that puck 25 and seat 26 always engage in the same circular ring. This ensures that leakage does not develop between puck 25 and valve seat 26 from eccentric and overlapping successive engagements.

Another preferred valve embodiment 60 using a cylindrically shaped helical spring 50 to support a solenoid armature 40 is shown in FIG. 4. Except for armature 40, spring 50, and seal 45, parts of solenoid 11, including coil 12, flux stop 13, and abutment core 14 are all as previously described for the embodiment of FIGS. 1 and 2.

The main difference in the embodiment of FIG. 4 is the use of a helical coil spring 50, rather than a washer shaped spring such as shown in FIGS. 1 and 2. Helical coil spring 50 is preferably machined of a piece of spring steel and formed in a generally cylindrical shape with a moveable end flange 36 fitting armature 40 and a fixed end flange 36 fitting valve body 35. Spring 50 can also have its fixed and moveable ends welded in place, but since it is being made of machined steel, it is efficient to form a fixed flange 36 fitted to valve body 35 and a movable end flange 37 fitted to and supporting armature 40. Such flanges can be shaped in many different ways.

As explained for valve 10 of FIGS. 1 and 2, valve 60 of FIG. 4 moves armature 40 axially to pull seal 45 away from valve seat 46, against the bias of spring 50, without armature 40 or seal 45 departing from a translational movement. Also, armature 40 contacts only spring 50 and abutment 14 and does not slide in contact with any fixed valve surface during opening and closing movement. Valve 60 thus accomplishes the same goals of particle-free and accurate operation as described for valve 10.

Seal 45, as shown in FIGS. 4 and 5 is preferably based on U.S. Pat. No. 6,135,132, which shows how a seal of tetrafluoroethylene can be arranged to perform well in a poppet valve environment. Tests made according to this invention have determined that a washer shaped spring support 30, as illustrated in FIGS. 1, 2, and 5 can perform accurately enough to accommodate the limitations of a tetrafluoroethylene seal 45. The results of these tests show that armature 20 is accurately consistent in its translational movement so that seal 45 performs flawlessly.

Besides ensuring accurate axial translational movement of armature 20, support spring 30 and solenoid 11 operate to ensure that armature 20 does not rotate. This occurs partially from the controlled support of spring 30 and partly from the fact that magnetic flux forces are applied only peripherally of armature 20 and only axially of armature 20 so that no force tends to rotate armature 20. A washer shaped spring support 30, because of its accurate control of armature movement, thus promises to accommodate any sort of puck or sealing material required for a poppet valve.

Figure 6:
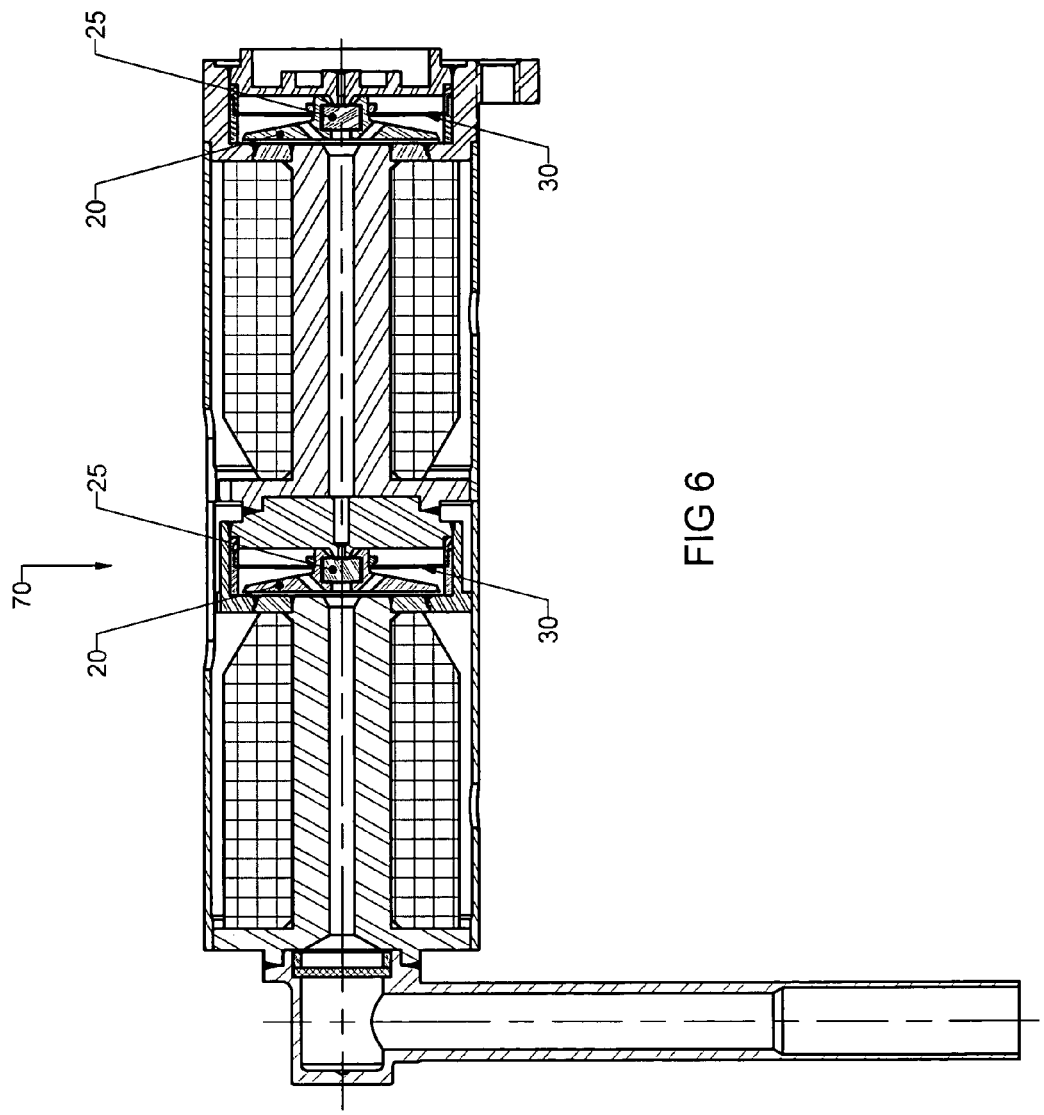
FIGS. 6 and 7 are cross-sectional views of the inventive valve arranged in tandem, as is preferred for space vehicle purposes, and supplied with washer-shaped spring supports providing respectively one pound and five pound closure forces for mono propellants.
Figure 7:
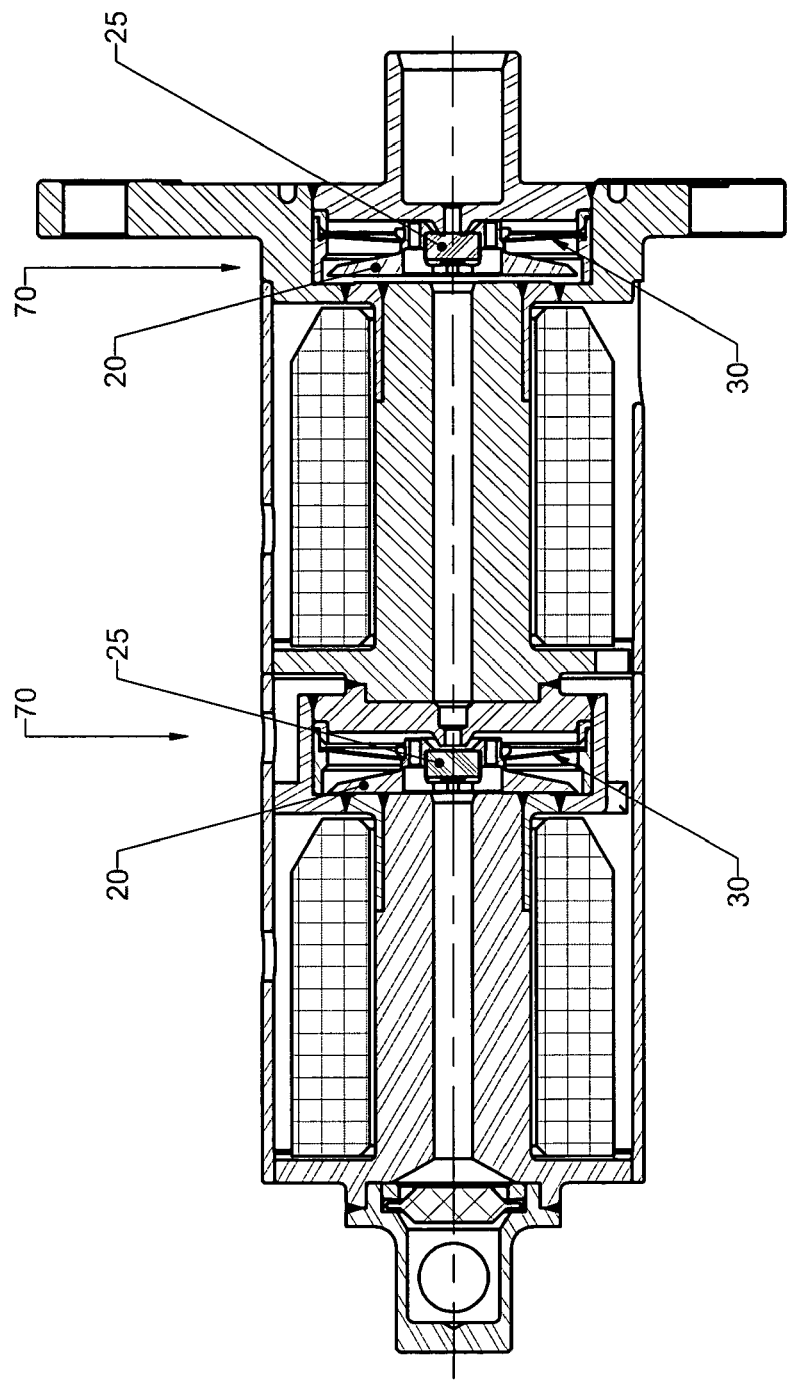

FIGS. 6 and 7 show valves 70, which are similar to valves 10 of FIGS. 1 and 2, arranged in tandem, as is preferred for space vehicles. Allowing a discharge of propellant for maneuvering purposes requires that both valves 70 be open, and the tandem arrangement of valves 70 increases the chances that at least one of the valves 70 will close to prevent any unwanted waste of propellant. The valves of FIGS. 6 and 7 each use a washer-shaped spring 30 such as described above and shown in FIGS. 3A–C, to support and bias an armature 20 carrying a valve sealing puck 25, as also explained above.

Differences between the valves of FIGS. 6 and 7 primarily involve a one pound closing bias for springs 30 in valve 70 of FIG. 6, and a five pound closure bias of springs 30 of valves 70 of FIG. 7. Armatures 20 of valves 70 of FIGS. 6 and 7 also move translationally without any sliding contact with other valve parts, as previously explained.

Figure 8:
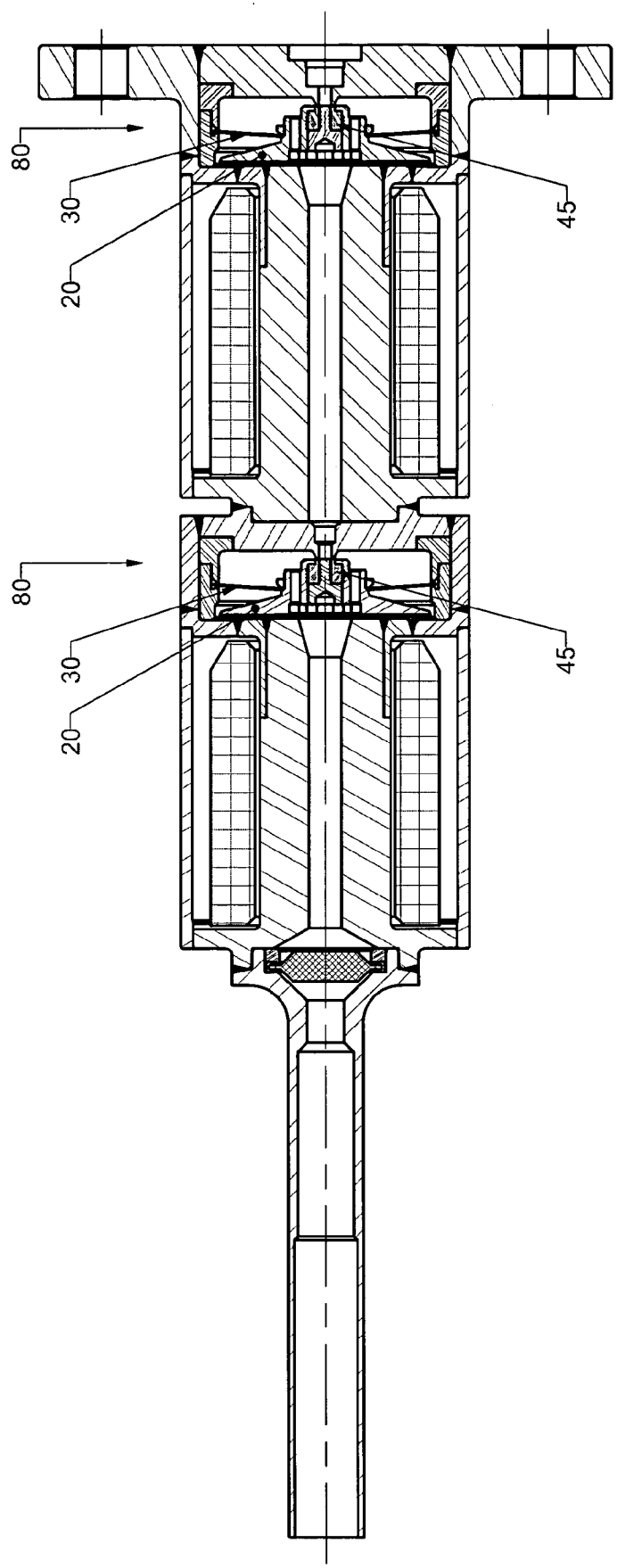
FIG. 8 is a cross-sectional view of another version of the inventive valve arranged in tandem and using washer-type spring supports deployed for five pound closure forces and a seal arrangement suitable for bi-propellant.

Valve 80 of FIG. 8 uses a pair of valves that are each similar to the valve of FIG. 5, but are arranged in tandem as preferred. Armatures 20 are supported for translational movement by washer-type springs 30 which apply a five pound valve closure bias. Seal 45 is preferably a tetrafluoroethylene seal such as previously described for the valves of FIGS. 4 and 5 as suitable for bi-propellants. Springs 30, as previously explained, have been proven to control translational movement of armature 30 accurately enough for reliable operation of seals 45.

Figure 9:
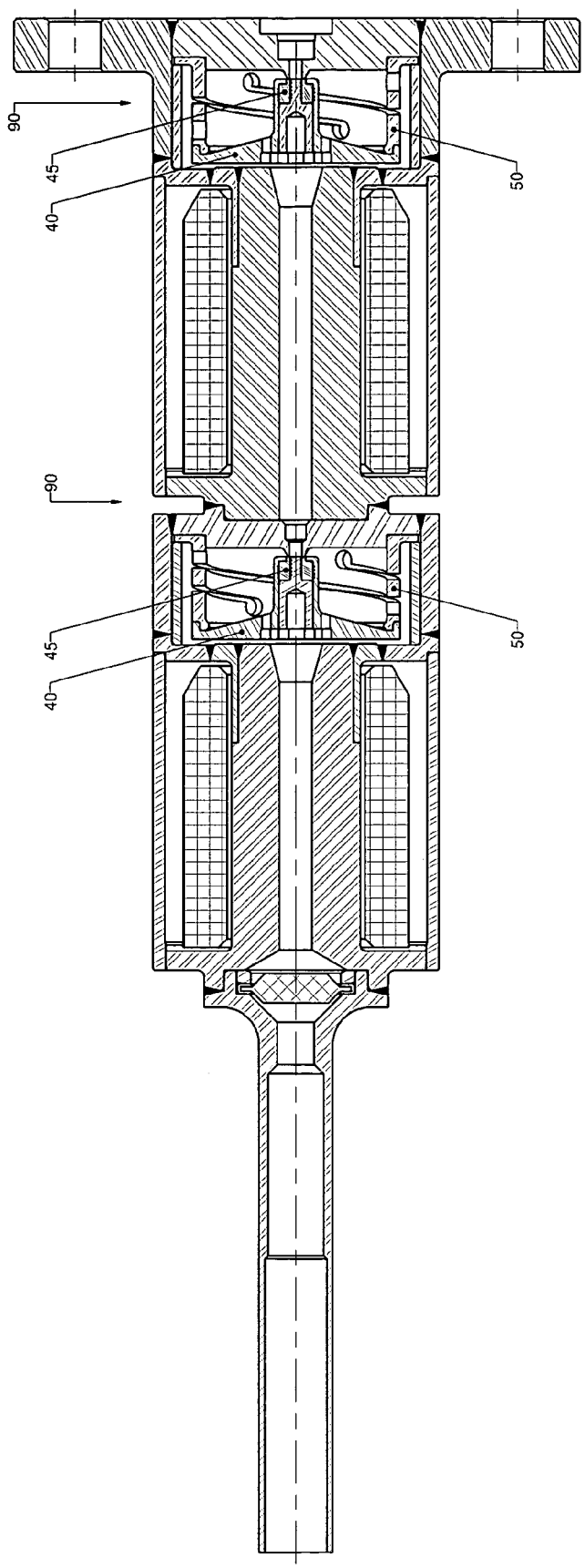
FIG. 9 is a cross-sectional view of another variation of the inventive valve arranged in tandem and having helical spring supports exerting five pound closure forces on seals suitable for bi-propellants.

Valves 90, of FIG. 9, are shown arranged in tandem for bi-propellant control, and are otherwise similar to valves 60 shown in FIG. 4. Valves 90 use helical springs 50 supporting and controlling the translational movement of armatures 40, which carry seals 45 of the type shown in FIGS. 4, 5, and 8 for bi-propellant control. Helical springs 50 are arranged to exert five pounds closure force on seals 45 of valves 90, but different closure forces are also possible.

Many different arrangements of disk and helical springs can achieve the same advantages as explained for the illustrated valves. Also different materials and solenoids can be used to adapt the invention to different applications.

What is claimed is:

1. In a solenoid-controlled valve having a seat around a valved opening, a seal arranged to engage the seat to close the valved opening, an armature holding the seal for movement out of and into engagement with the seat, a spring supporting the armature for movement and biasing the armature toward a closed valve position, and a solenoid arranged to move the armature against the spring bias to open the valve, the improvement comprising:
the spring being flat and generally washer-shaped with a generally circular outer and inner perimeters that are each larger than the seat and concentric with the seat;
the outer perimeter being secured to a body of the valve;
the inner perimeter supporting the armature for axial movement during which the armature has no sliding engagement with any valve surface;
the solenoid being arranged to apply a magnetic force to an armature perimeter that is larger than the seat and concentric with the seat;
the inner perimeter being secured within a groove in the armature;
the outer perimeter being trapped in a groove in the valve body allowing the outer perimeter to move slightly as the inner perimeter moves axially; and
the spring being formed of a non-stretchable material that allows only axial translational movement of the armature between open and closed positions.

2. The valve of claim 1 wherein the spring has slots extending radially outward from the inner perimeter part-way toward the outer perimeter.

3. The valve of claim 1 wherein the spring has slots extending radially inward from the outer perimeter part-way toward the inner perimeter.

4. The valve of claim 1 wherein the seal has a flat surface engaging the seat.

5. The valve of claim 1 wherein the seal is compressed within a recess in the armature.

6. The valve of claim 1 wherein the spring, armature, and seal are arranged to ensure that repeated engagements of the seal and the seat occur along a single line of contact on the seal.

7. A spring support arrangement for a solenoid armature carrying a valve-closing seal, the arrangement comprising:
a spring extending radially between the armature and a body of the valve to support the armature and to hold the armature clear of other valve surfaces as the armature moves away from and toward a closed valve position;
the spring biasing the armature toward the closed valve position;
the spring restraining the armature from moving radially or rotationally while allowing the armature to move axially in translation so that the seal engages a seat of the valve repeatedly in a single line of contact;
the spring being flat and generally washer-shaped with a generally circular inner perimeter and a generally circular outer perimeter;
the spring being formed of a non-stretchable material allowing the spring to move from a flat to a non-flat configuration as the armature moves to an open valve position;
the inner perimeter of the spring being trapped in a groove in the armature; and
the outer perimeter of the spring being trapped in a groove in the valve body so that the outer perimeter can move slightly within the valve body groove as the spring moves between the flat and the non-flat configurations.

8. The spring support arrangement of claim 7 wherein the spring has slots extending radially inward from the outer perimeter part-way toward the inner perimeter.

9. The spring support arrangement of claim 8 wherein the spring has slots extending radially outward from the inner perimeter part-way toward the outer perimetea.

10. The spring support arrangement of claim 7 wherein the spring and the armature are each radially larger than the seat and are each concentric with the seat.

11. A solenoid armature support and guidance system for a valve, the system comprising:
a spring providing both support and guidance for the armature;
the spring holding the armature concentrically of a solenoid and biasing the armature toward a seat for the valve;
the spring allowing the armature to translate axially of the solenoid and the valve seat;
the spring restraining the armature from deviation from the axial translation;
the spring extending radially between the armature and to a body of the valve;
the spring holding the armature clear of engagement with any valve surface during axial movement of the armature;
magnetic flux generated by the solenoid acting on a periphery of the armature to cause the axial translation of the armature;
the armature carrying a seal that engages the valve seat to close the valve;
the spring being shaped as a flat annulus with generally circular inner and outer perimeters;
the inner perimeter of the spring being trapped in a groove in the armature and the outer perimeter of the spring being trapped in a groove in the valve body; and
the outer perimeter being free to move slightly within the valve body groove as the inner perimeter of the spring moves in the axial translation with the armature.

12. The system of claim 11 wherein the spring has slots extending radially outward from the inner perimeter part-way toward the outer perimeter.

13. The system of claim 11 wherein the seal has slots extending radially inward from the outer perimeter part-way toward the inner perimeter.

14. The system of claim 11 wherein the spring ensures that a flat surface of the seal repeatedly engages the seat in a single line of engagement.

15. A solenoid valve comprising:
an armature supported by a spring to move without contacting any valve surfaces as the armature travels from closed to open valve positions;
the spring biasing the armature toward the closed valve position, and a solenoid moving the armature to the open valve position;
the spring being concentric with the armature and arranged to hold the armature against radial or rotational movement while allowing the armature to move in translation axially of the solenoid;
the spring having a flat annular shape and being formed of a non-stretchable material
a generally circular inner perimeter of the spring being trapped in a groove in the armature;
a generally circular outer perimeter of the spring being trapped in a groove in the valve body allowing the outer perimeter to move slightly as the inner perimeter guides the armature in the axial translation.

16. The valve of claim 15 wherein the spring has notches extending radially from one of the perimeters part-way toward another of the perimeters.

17. The valve of claim 15 wherein the armature has a recess in which a valve closing seal is compressed.

18. The valve of claim 15 wherein the armature carries a valve closing seal with a flat surface engaging a seat of the valve.

19. A system supporting and allowing movement of an armature of a solenoid valve, the system comprising:
- a generally circular and annular shaped spring extending radially from a body of the valve to the armature to hold the armature for movement between open and closed valve positions;
- the spring biasing the armature toward the closed valve position;
- a solenoid being actuatable to draw the armature to the open valve position;
- the spring holding the armature clear of any valve surface during its movement between the closed and open valve positions;
- the spring being arranged to allow only linear and axial translational movement of the armature;
- the spring being arranged to prevent any radial or rotational movement of the armature;
- an inner perimeter of the annular spring being trapped in a groove in the armature and an outer perimeter of the annular spring being trapped in a groove in the valve body so that the spring perimeters can move slightly within the respective grooves as the inner perimeter of the spring guides the armature in the linear and axial translational movement.

20. The valve of claim 19 wherein the spring has slots extending radially inward from the outer perimeter part-way toward the inner perimeter.

21. The valve of claim 19 wherein the spring has slots extending radially outward from the inner perimeter part-way toward the outer perimeter.

22. The valve of claim 19 wherein the armature carries a valve closing seal having a flat surface engaging a seat of the valve.

23. A support for an armature of a solenoid valve, the support comprising:
- a generally plane and annular spring having an inner periphery trapped in a groove in the armature to support the armature for axial movement;
- an outer periphery of the spring being trapped in a concentric groove in a body of the valve;
- the spring biasing the armature toward a closed valve position;
- the outer periphery of the spring being movable slightly within the body groove to allow the inner periphery of the spring to move axially with the armature while minimizing any radial movement of the armature; and
- the spring being formed of a flexible and non-stretchable material.

24. The support of claim 23 wherein the armature carries a valve closing seal having a flat surface engaging the valve seat.

25. The support of claim 23 wherein the armature while moving toward and away from a closed valve position does not contact any valve surface other than the spring.

26. The support of claim 23 wherein the outer periphery of the spring is secured between the valve body and a spacer ring fitted to the valve body.

27. The support of claim 23 wherein the spring has peripheral and radially extending notches.

* * * * *

UNITED STATES PATENT AND TRADEMARK OFFICE
CERTIFICATE OF CORRECTION

| | | |
|---|---|---|
| PATENT NO. | : 7,159,843 B1 | Page 1 of 1 |
| APPLICATION NO. | : 11/131495 | |
| DATED | : January 9, 2007 | |
| INVENTOR(S) | : Mullally et al. | |

It is certified that error appears in the above-identified patent and that said Letters Patent is hereby corrected as shown below:

<u>Column 6</u>

Line 3, replace the word "perimetea" with the word --perimeter--

Line 58, replace the word "material" with the word --material;--

Signed and Sealed this

Thirteenth Day of March, 2007

JON W. DUDAS
*Director of the United States Patent and Trademark Office*